(12) United States Patent
Friedrich

(10) Patent No.: US 6,722,337 B2
(45) Date of Patent: Apr. 20, 2004

(54) SPARK IGNITION INTERNAL COMBUSTION ENGINE

(75) Inventor: Gruber Friedrich, Hippach (AT)

(73) Assignee: Jenbacher Aktiengesellschaft, Jenbach (AU)

(*) Notice: Subject to any disclaimer, the term of this patent is extended or adjusted under 35 U.S.C. 154(b) by 0 days.

(21) Appl. No.: 10/132,772

(22) Filed: Apr. 25, 2002

(65) Prior Publication Data
US 2002/0157634 A1 Oct. 31, 2002

(30) Foreign Application Priority Data
Apr. 25, 2001 (AT) .................................... 664/2001

(51) Int. Cl.$^7$ ................................ F02B 23/10
(52) U.S. Cl. ..................... 123/193.6; 123/279
(58) Field of Search .................. 123/193.6, 279, 123/276

(56) References Cited

U.S. PATENT DOCUMENTS

| | | | | |
|---|---|---|---|---|
| 3,766,900 A | * | 10/1973 | Aiti | 123/279 |
| 3,965,872 A | * | 6/1976 | Taira et al. | 123/193.6 |
| 4,176,628 A | * | 12/1979 | Kanai et al. | 123/193.6 |
| 4,480,625 A | * | 11/1984 | Kanda et al. | 123/279 |
| 4,751,902 A | | 6/1988 | August | |
| 5,778,533 A | * | 7/1998 | Kemnitz | 123/193.6 |
| 6,216,662 B1 | * | 4/2001 | Sapsford | 123/279 |

FOREIGN PATENT DOCUMENTS

| | | |
|---|---|---|
| DE | 1 913 115 | 10/1969 |
| DE | 20 58 410 A | 6/1972 |
| DE | 37 26 027 A1 | 2/1989 |
| DE | 197 30 842 A1 | 1/1999 |
| EP | 299 747 A2 | 1/1989 |
| EP | 407 974 A1 | 1/1991 |
| EP | 598 941 A1 | 6/1994 |
| EP | 971 109 A1 | 1/2000 |
| EP | 0990 779 A1 | 4/2000 |
| GB | 2 169 656 A | 7/1986 |
| JP | 2000-038922 | 2/2000 |
| JP | 2000-274306 | 10/2000 |

\* cited by examiner

*Primary Examiner*—Marguerite McMahon
(74) *Attorney, Agent, or Firm*—Larusso Loud & Kelly LLP

(57) ABSTRACT

A spark ignition internal combustion engine (1), in particular an Otto-cycle gas engine, with at least one ignition device (14) per cylinder (2), wherein at least one piston (4) has a recess (8) in the piston head and wherein the recess (8) in plan view on to the piston head is of a substantially heart-shaped shape which differs at least in a region-wise manner from a circular shape, wherein the shape of the recess (8) in a plan view on to the piston head has precisely one axis of symmetry (10).

14 Claims, 3 Drawing Sheets

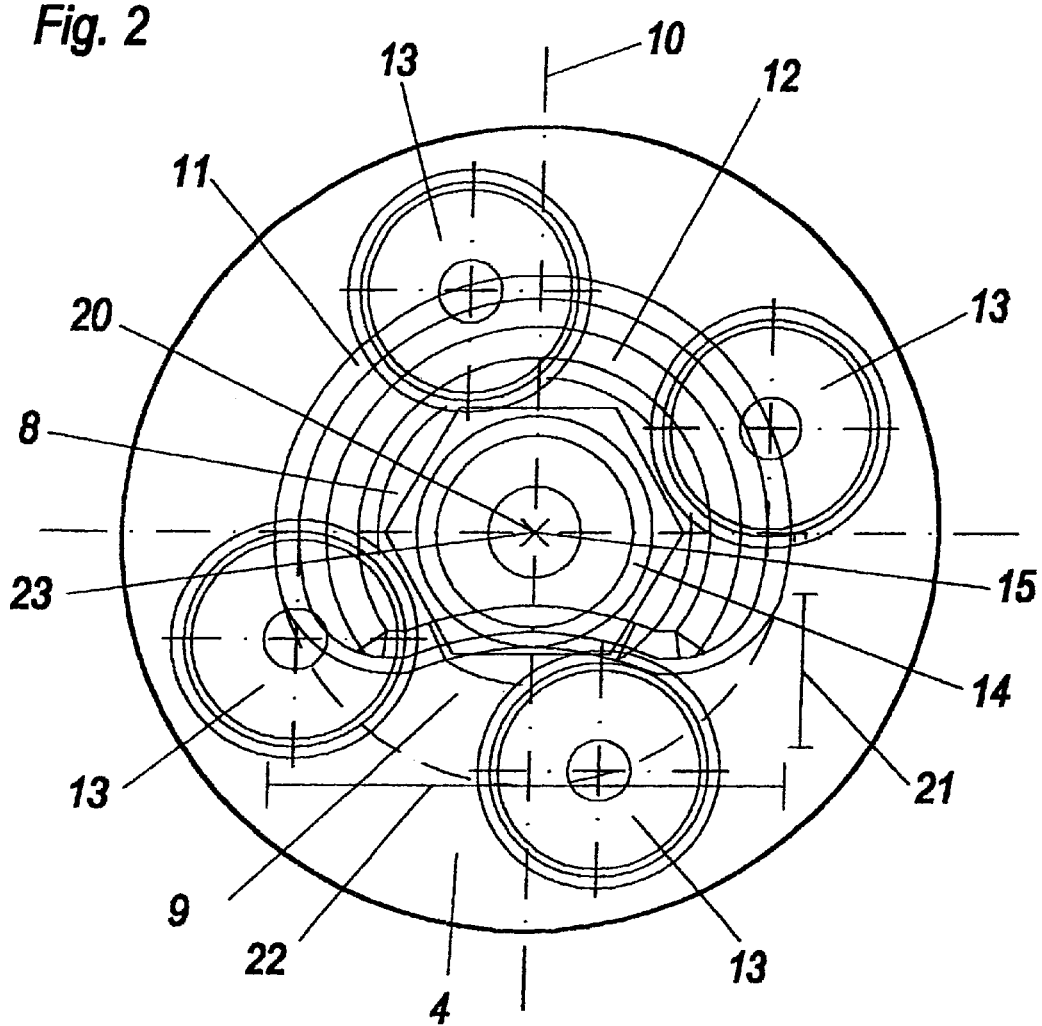

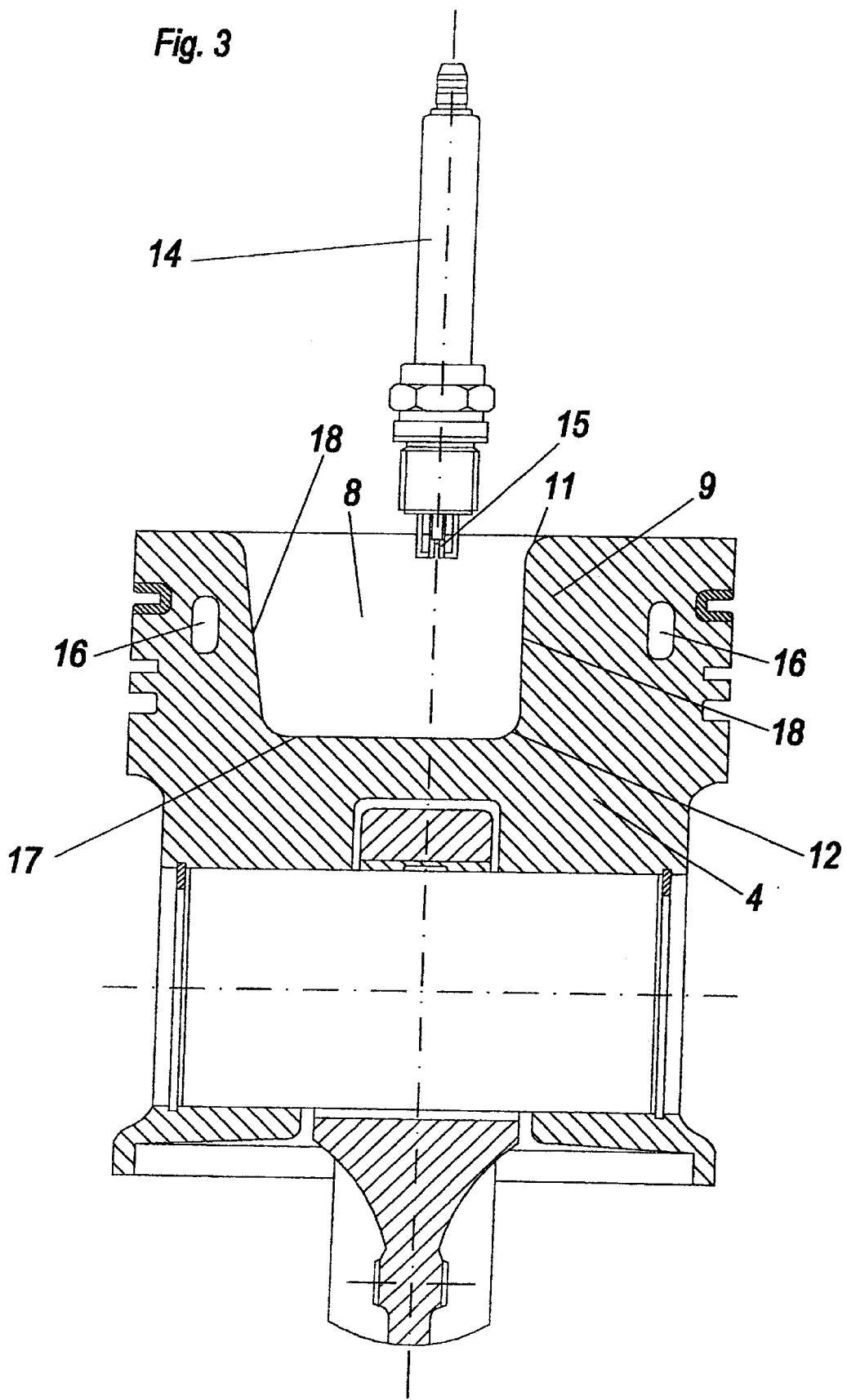

SPARK IGNITION INTERNAL COMBUSTION ENGINE

BACKGROUND OF THE INVENTION

The invention concerns a spark ignition internal combustion engine with at least one ignition device per cylinder wherein at least one piston has a recess in the piston head.

Internal combustion engines with pistons of that kind are already known, wherein the recess can in part be of a bowl or tub shape (Hyronen combustion chamber). It can be disposed centrally or eccentrically in the piston. In addition, EP 0 598 941 A1 and EP 0 299 747 A2 also disclose piston recesses which are of a configuration that differs from the simple bowl or tub shape. The purpose of such a recess is to improve engine combustion and in particular to achieve very fast, stable and anti-knock combustion. That can only be attained by ensuring optimum turbulence or flow speed in the region of the ignition location of the spark plug. In that respect it is to be noted that, with excessively high flow speeds in the region of the ignition location the ignition spark is blown out while with excessive low flow speeds in the region of the ignition location combustion takes place too slowly and too sluggishly. In the internal combustion engines which are already known, with recesses in the piston head, in accordance with the state of the art, an optimum flow speed in the region of the ignition location is only inadequately ensured.

SUMMARY OF THE INVENTION

Therefore the object of the present invention is to design a recess in the piston head in such a way that the above-mentioned disadvantages of the prior art are eliminated and optimum and fast combustion in the combustion chamber of spark-ignition internal combustion engines is ensured.

In accordance with the invention that is achieved in that the recess in plan view on to the piston head is of a substantially heart-shaped shape which differs at least in a region-wise manner from a circular shape, wherein the shape of the recess in a plan view on to the piston head has precisely one axis of symmetry.

The configuration of the recess in the piston head, in accordance with the invention, provides that the flow speed at the ignition location is in the optimum range (between about 4 m/sec and 6 m/sec). That therefore ensures that the ignition spark at the ignition location is neither blown out by excessively high flow speeds nor does excessively slow combustion of the fuel-air mixture take place due to excessively low flow speeds at the ignition location. Ensuring an optimum flow speed at the ignition location, in accordance with the invention, provides for very fast combustion of the fuel-air mixture in the entire combustion chamber, as is otherwise known only in relation to compression-ignition internal combustion engines (for example diesel engines). The invention can preferably be used in Otto-cycle gas engines.

In that respect a particularly advantageous embodiment provides that the recess is of a non-convex shape in a plan view on to the piston head. In this respect the term 'non-convex' relates to the fact that, in a plan view on to the piston head, not all connecting lines between any two points on the periphery of the shape of the recess according to the invention extend within the recess.

Advantageous variants of the recess according to the invention are in this connection characterised in that in a plan view on to the piston head the recess, over an angular region of between 200° and 250°, preferably between 220° and 230°, is of a substantially circular peripheral shape, preferably with the center point of the circular piston area as the center of the circle.

Further advantageous embodiments provide that in a plan view on to the piston head the recess has an inwardly extending portion. It is desirable in that respect if in a plan view on to the piston head the inwardly extending portion extends over an angular region of between 80° and 130°, preferably between 100° and 110°. In addition it is desirable if in a plan view on to the piston head the inwardly extending portion extends into the interior of the recess over a maximum extent of between 25% and 50%, preferably between 35% and 40%, of the largest diameter of the recess.

It is further important for the ignition location of the ignition device to be arranged at a favourable position with respect to the recess. In that respect a highly favourable alternative configuration provides that at least one ignition device has an ignition location, wherein the ignition location in projection on to the plan view on to the piston head is substantially on the axis of symmetry of the recess and/or substantially at the center point of the circle of the circular region of the peripheral shape of the recess.

With regard to the arrangement of the recess according to the invention in relation to the inlet and exhaust valves of the cylinder of the internal combustion engine, it is desirable if in a plan view on to the piston head the axes of symmetry of the arrangement of the inlet and exhaust valves assume an acute angle, which differs from 0°, 45° and 90°, with respect to the axis of symmetry of the recess. That arrangement provides that the structure involves an asymmetrical position of the recess in accordance with the invention, in relation to the preferred flow directions of the fuel-air mixture flowing in and out through the inlet and exhaust valves. That is in turn particularly desirable in terms of achieving an optimum flow speed for the fuel-air mixture and optimum turbulence of the fuel-air mixture at the ignition location.

In order to achieve adequate cooling of the piston with the recess according to the invention, it is particularly desirable for a cooling duct to be arranged in the piston in the material surrounding the recess.

Desirable embodiments further provide that the shape of the recess, as viewed in a plan view on to the piston head, extends substantially over the full depth of the recess.

BRIEF DESCRIPTION OF THE DRAWING

Further advantages and features of the invention are described in greater detail with reference to the description hereinafter of the accompanying drawings in which:

FIG. 2 is a plan view on to a piston head with a recess according to the invention with projections of the ignition device and the valves, and FIG. 3 is a side view of a piston with the recess according to the invention.

FIG. 1 diagrammatically shows an Otto-cycle gas engine 1. It has cylinders 2, in which pistons 4 with recesses 10 according to the invention are movably supported. The fuel gas G-air L-mixture is fed to the individual cylinders through the fuel gas-air mixture feed duct 6, flows through the valves (not shown here) into the combustion chambers of the cylinders 2 and is there compressed and then ignited by the spark plugs 14. The resulting movement of the pistons 4 is transmitted to a drive shaft 3. The exhaust gases which occur upon combustion of the fuel gas-air mixture in the cylinders 2 leave the cylinders through the exhaust valves (not shown here) and then leave the engine through the exhaust pipe 7.

DETAILED DESCRIPTION OF THE INVENTION

Figure 1:
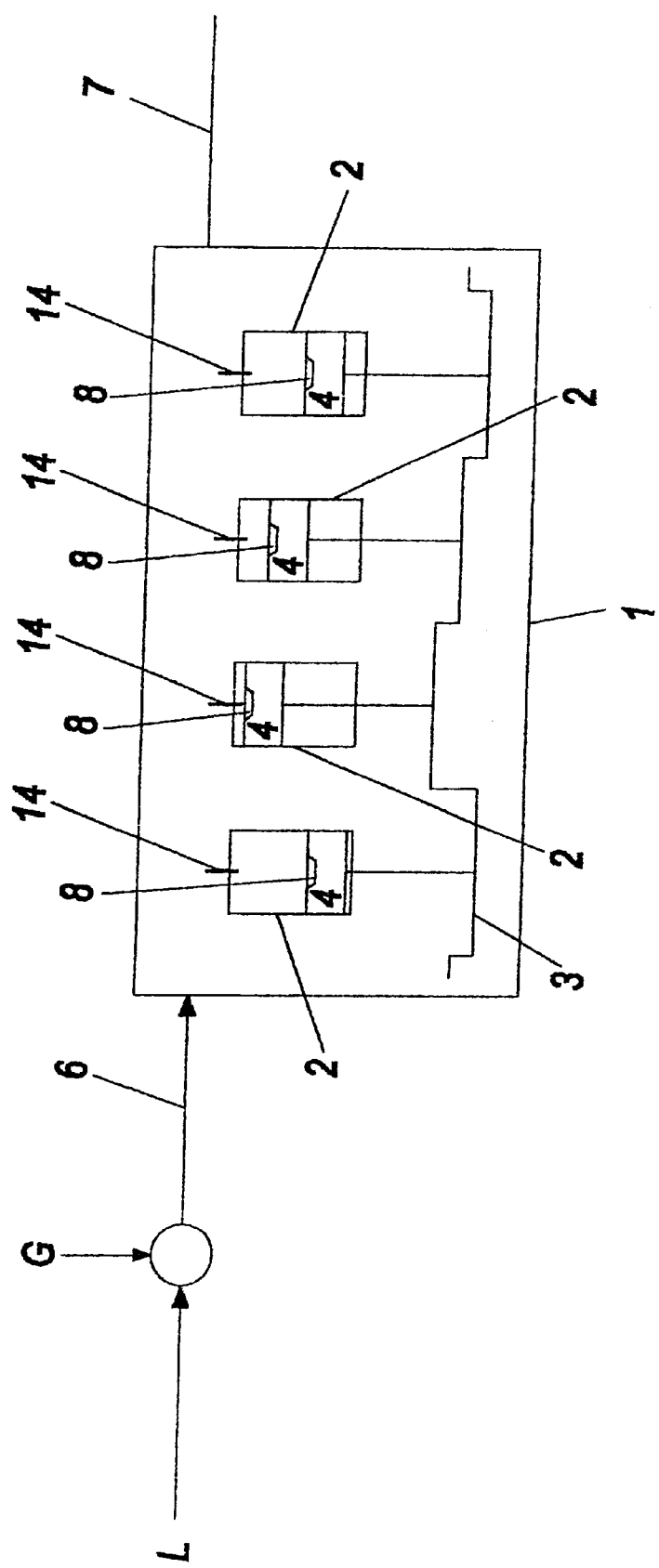
FIG. 1 is a diagrammatic view of a spark ignition Otto-cycle gas engine.

FIG. 2 shows a heart-shaped recess 8 in accordance with the invention, as a plan view on to the piston head of the piston 4. In this case the heart-shaped recess 8 has an inwardly extending portion 9 and an axis of symmetry 10. The rounded-off regions at the upper edge 11 and the lower edge 12 of the recess are shown in detail in FIG. 3. The recess illustrated in the plan view in FIG. 2 is of a circular shape over wide regions (over an angular region of about 226°). The inwardly extending portion 9 extends over an angular region of 104°. The maximum extent 21 of the inwardly extending portion 9 reaches about 36% of the maximum diameter 22 of the recess. The valves 13 and the ignition device (here a spark plug) 14 with the ignition location 15 are shown here in a projection on to the piston head. In that respect it is firstly to be noted that none of the axes of symmetry which can be laid through the valve arrangement coincides with the axis of symmetry of the heart-shaped recess. The Figure also shows that the projection of the ignition location 15 comes to lie both on the axis of symmetry 10 of the heart-shaped recess 8 and also on the center point 23 of the circle of the circular region of the peripheral shape of the recess 8. That relative position as between the recess 8 and the ignition location 15 provides for a particularly favourable flow speed of the fuel gas-air mixture at the ignition location 15 as well as favourable turbulence of the fuel gas-air mixture in the entire recess and combustion chamber. The flow speeds reached in this case at the ignition location 15 are in the optimum range of between 4 and 6 m/sec.

FIG. 3 shows a side view on to a section through the piston 4 with the recess 8 according to the invention and the inwardly extending portion 9 thereof. Also shown is the spark plug 14 with the ignition location 15. A cooling duct 16 for cooling the piston is incorporated into the piston 4 around the recess. In this case, the shape of the recess 8 and the configuration of the cooling duct 16 are so matched to each other that adequate wall thicknesses remain in any region of the piston 4 to guarantee the necessary stability for the piston.

The valves 13 are not shown in FIG. 3. FIG. 3 shows that the walls 18 and 19 of the recess are severally perpendicular and the recess bottom 17 is substantially horizontal in this embodiment. The horizontal cross-sectional shape of the recess 8 thus preferably remains substantially the same over the full depth of the recess 8. The recess 8 can basically be in the form of a separate insert. A one-part structure with the rest of the piston is more favourable however, in which respect the piston head 24 is drawn inwardly in a location-wise manner, and thus forms the recess 8.

The embodiment shown in FIGS. 2 and 3 of a recess 8 according to the invention makes it possible to achieve very fast, stable and anti-knock combustion, in which respect the recess according to the invention is advantageously combined with a position for the ignition location 15 as shown in FIG. 2 and with a swirl-generating inlet duct disposed in the cylinder head.

What is claimed is:

1. A spark ignition internal combustion engine with at least one ignition device per cylinder, wherein at least one piston has a recess in the piston head, and wherein the recess in plan view onto the piston head is of a substantially heart-shaped shape which differs at least in a region-wise manner from a circular shape, wherein the shape of the recess in a plan view onto the piston head has precisely one axis of symmetry and the ignition location of the at least one ignition device in projection onto the plan view onto the piston head lies substantially on the axis of symmetry of the recess and substantially at the center of the circle of the circular region of the peripheral shape of the recess.

2. A spark ignition internal combustion engine as set forth in claim 1, wherein the recess is of a non-convex shape in a plan view onto the piston head.

3. A spark ignition internal combustion engine as set forth in claim 1, wherein the spark ignition internal combustion engine is an Otto-cycle gas engine.

4. A spark ignition internal combustion engine as set forth in claim 1, wherein in a plan view onto the piston head, the recess is of a substantially circular peripheral shape over an angular region of between 200° and 250°.

5. A spark ignition internal combustion engine as set forth in claim 1, wherein in a plan view onto the piston head, the recess is of a substantially circular peripheral shape over an angular region of between 220° and 230°.

6. A spark ignition internal combustion engine as set forth in claim 1, wherein in a plan view onto the piston head, the recess has an inwardly extending portion.

7. A spark ignition internal combustion engine as set forth in claim 6, wherein in a plan view onto the piston head, the inwardly extending portion extends over an angular region of between 80° and 130°.

8. A spark ignition internal combustion engine as set forth in claim 6, wherein in a plan view onto the piston head, the inwardly extending portion extends over an angular region of between 100° and 110°.

9. A spark ignition internal combustion engine as set forth in claim 6, wherein when viewed in a plan view onto the piston head, the inwardly extending portion extends into the interior of the recess over a maximum extent of between 25% and 50% of the largest diameter of the recess.

10. A spark ignition internal combustion engine as set forth in claim 6, wherein when viewed in a plan view onto the piston head, the inwardly extending portion extends into the interior of the recess over a maximum extent of between 35% and 40% of the largest diameter of the recess.

11. A spark ignition internal combustion engine as set forth in claim 1, wherein in a plan view onto the piston head, the axes of symmetry of the arrangement of the inlet and exhaust valves assume an acute angle differing from 0°, 45° and 90°, relative to the axis of symmetry of the recess.

12. A spark ignition internal combustion engine as set forth in claim 1, wherein a cooling duct is arranged in the piston in the material surrounding the recess.

13. A spark ignition internal combustion engine as set forth in claim 1, wherein the shape of the recess, as viewed in a plan view onto the piston head, extends substantially over the full depth of the recess.

14. A spark ignition internal combustion engine as set forth in claim 1, further comprising a fuel gas-air mixture feed duct per cylinder.

* * * * *